(12) United States Patent
Miki

(10) Patent No.: US 8,657,977 B2
(45) Date of Patent: Feb. 25, 2014

(54) PNEUMATIC TIRE AND METHOD FOR MAKING UNCURED RUBBER TIRE COMPONENT

(75) Inventor: Youjirou Miki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1233 days.

(21) Appl. No.: 11/637,703

(22) Filed: Dec. 13, 2006

(65) Prior Publication Data

US 2007/0151642 A1 Jul. 5, 2007

(30) Foreign Application Priority Data

Dec. 29, 2005 (JP) ................................ 2005-380589

(51) Int. Cl.
*B29D 30/06* (2006.01)
*B29D 30/52* (2006.01)
*B29D 30/60* (2006.01)

(52) U.S. Cl.
USPC ...................... 156/110.1; 156/123; 156/128.1

(58) Field of Classification Search
None
See application file for complete search history.

(56) References Cited

U.S. PATENT DOCUMENTS 4,711,286 A * 12/1987 Kabe et al. .................... 152/527
4,990,203 A 2/1991 Okada et al.

FOREIGN PATENT DOCUMENTS

| DE | 3916271 | A1 | | 3/1990 |
|----|---------|----|----|--------|
| DE | 4212295 | A1 | | 10/1993 |
| EP | 0403420 | A2 | | 12/1990 |
| EP | 0414470 | A2 | | 2/1991 |
| EP | 0455454 | A1 | | 11/1991 |
| EP | 0712739 | A1 | | 5/1996 |
| EP | 1033218 | A2 | | 9/2000 |
| EP | 1186401 | A2 | | 3/2002 |
| JP | 7-251466 | | * | 10/1995 |
| JP | 7-251466 | A | | 10/1995 |
| JP | 9-104205 | A | | 4/1997 |
| JP | 2000-94542 | A | | 4/2000 |
| JP | 2001-179848 | | * | 7/2001 |
| JP | 2002-361756 | | * | 12/2002 |
| JP | 2003-71945 | | * | 3/2003 |
| JP | 2003-220806 | | * | 8/2003 |
| JP | 2003-305781 | | * | 10/2003 |

OTHER PUBLICATIONS

Machine translation of JP 2001-179848, 2001.*

* cited by examiner

*Primary Examiner* — Justin Fischer
(74) *Attorney, Agent, or Firm* — Birch, Stewart, Kolasch & Birch, LLP

(57) ABSTRACT

A pneumatic tire is manufactured by vulcanizing the uncured tire formed by assembling uncured rubber tire components, at least one of which is made by winding a plurality of tapes around an axis while traversing the tapes along the axis, wherein the number of stroke of the traversing of the tapes is increased in a thick portion than in a thin portion of the tire component, and an angle between one end and the other end of each of the tapes around said axis is at most 90 degrees. The respective midpoints between the one end and the other end around the axis, of the tapes are sifted from each other in the circumferential direction of the tire.

9 Claims, 5 Drawing Sheets

PNEUMATIC TIRE AND METHOD FOR MAKING UNCURED RUBBER TIRE COMPONENT

The present invention relates to a method for manufacturing a pneumatic tire, more particularly to a method for making a tire component made up a large number of windings of a plurality of uncured rubber tapes.

In recent years, there has been proposed a method for manufacturing a pneumatic rubber tire in which uncured rubber tire components, e.g. a tread rubber, sidewall rubber and the like, are each made up of a large number of windings of a narrow thin uncured rubber tape.

In the case that the uncured rubber tire component has a patterned indented surface and thus it is necessary to provide on the surface with a down slope in the traversing direction, the tape applicator is programmed such that the traversing speed changes from a slow speed to a fast speed so as to change the winding pitches from a small pitch to a large pitch. conceptually, if the size (esp. width) of the tape is adequately small in comparison with the size of the rubber tire component to be formed, then, whatever shape the component has, by changing the pitches of the windings of the tape, namely, by changing the traversing speed of the tape applicator, the component can be made.

In actuality, however, the tape width is not so small in order to achieve an efficient winding operation, and during winding, the tape is twisted after let-off from the applicator. As a result, even if the tape applicator is progressed at the fast traversing speed according to the program, the let-off tape is gravitated towards the previous windings of the tape, in other words, gravitated backward rather than forward despite the fast progresses of the applicator. Therefore, the down slope and the required subsequent indentation are not formed. Due to such phenomenon of the let-off tape, it is not impossible, but very difficult to form every rubber tire component as intended.

It is therefore, an object of the present invention to provide a method for making an uncured rubber tire component, in which the difference between the intended shape and the actual cross-sectional shape of the uncured rubber tire component is decreased, and it is easier to make tire components having various cross sectional shapes.

According to the present invention, a method for making an uncured rubber tire component comprises: winding a plurality of tapes around an axis while traversing the tapes along the axis, so as to form the uncured rubber tire component as an annular body collectively formed by the windings of the tapes, wherein the tapes are made of an uncured rubber compound; the number of stroke of the traversing of the tapes is increased in a thick portion than in a thin portion of the tire component; an angle between one end and the other end of each of the tapes around the above-mentioned axis is at most 90 degrees; and the respective midpoints between the above-mentioned one end and the other end around the axis, of the tapes are sifted from each other in the circumferential direction of the tire component.

Here, in this invention, one stroke means a motion in one traversing direction from a point to another point. For example, in the case of a back-and-forth motion, such a motion is treated as two strokes in this invention usually, the tapes are wound directly or indirectly on a rotating drum, therefore, the above-mentioned axis is mostly the rotational axis of such drum.

According to the present invention, a method for manufacturing a rubber tire comprises the steps of: making an uncured rubber tire by assembling uncured rubber tire components, at least one of which is made by the above-method method; and vulcanizing the uncured rubber tire in a mold.

According to the present invention, therefore, a tire comprises a rubber component, e.g. a tread rubber, sidewall rubber or the like which is composed of multiple windings of a plurality of rubber tapes each having two ends, and an angle between one end and the other end of each of the tapes around the rotational axis of the tire is at most 90 degrees, and the respective midpoints between the one end and the other end around the tire rotational axis, of the tapes are sifted from each other in the circumferential direction of the tire. Preferably, the midpoints are equiangularly disposed around the tire rotational axis.

Other features and advantages of the invention will be apparent from the following description taken in connection with the accompanying drawing wherein.

Figure 1:
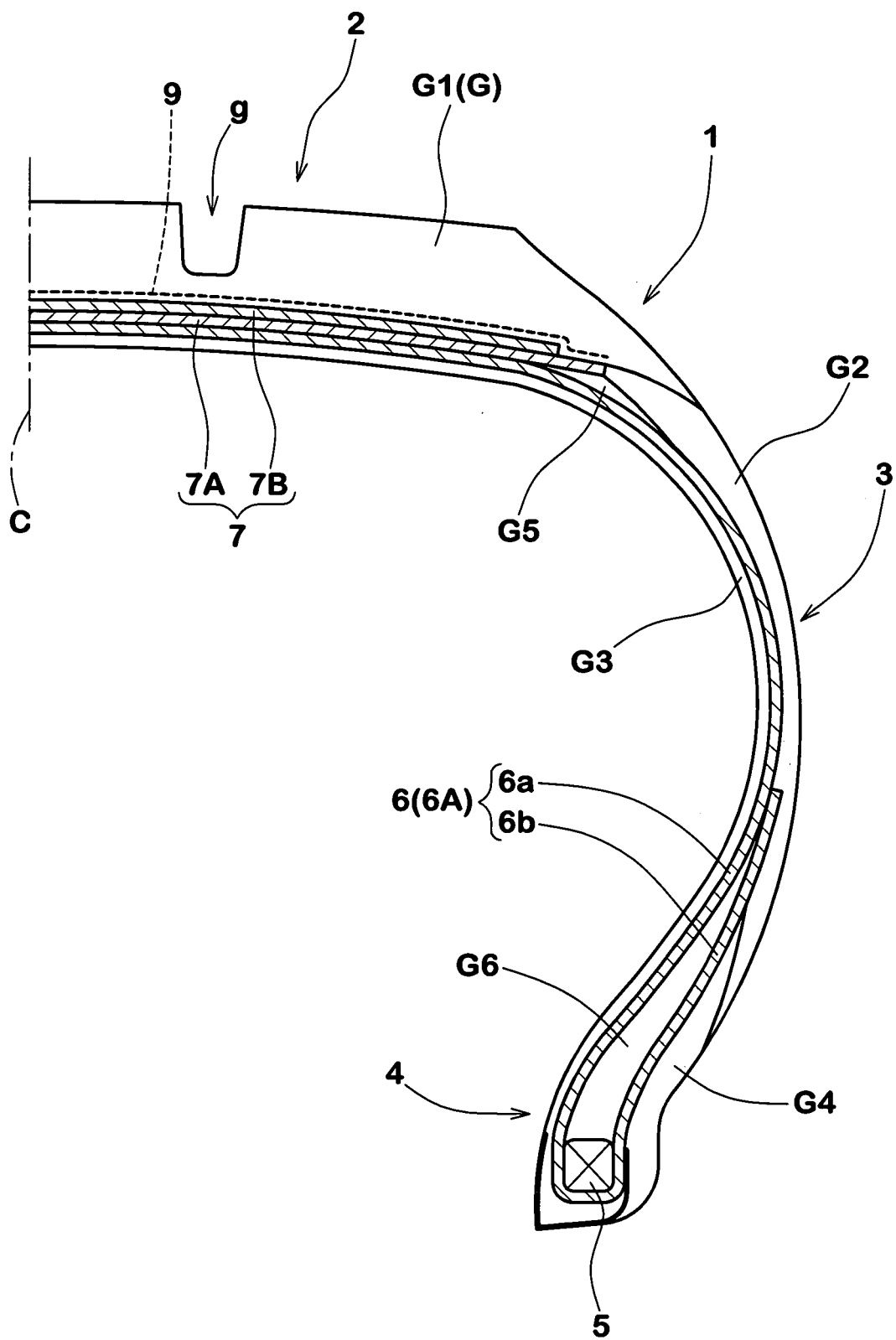
FIG. 1 is a cross sectional view of a pneumatic tire according to the present invention.

Embodiments of the present invention will now be described in detail in conjunction with the accompanying drawings.

In the drawings, pneumatic tire 1 according to the present invention comprises a tread portion 2, a pair of sidewall portions 3, a pair of axially spaced bead portions 4 each with a bead core 5 therein, a carcass 6 extending between the bead portions 4, a belt 7 disposed radially outside the carcass 6 in the tread portion 2, and rubber tire components G.

The tread portion 2 is provided within the ground contacting region with tread grooves defining a tread pattern.

The carcass 6 is composed of at least one, in this example only one ply 6A of cords arranged radially at an angle of 70 to 90 degrees with respect to the tire circumferential direction. The carcass ply 6A extends between the bead portions 4 through the tread portion 2 and sidewall portions 3, and is tuned up around the bead core 5 in each of the bead portions from the axially inside to the outside of the tire so as to form a pair of turned-up portions 6b and a main portion 6a therebetween.

The belt comprises a breaker 7 and optionally a band 9. The breaker 7 is composed of at least two cross plies 7A and 7B each made of parallel cords laid at an angle of from 10 to 35 degrees with respect to the tire circumferential direction. The band 9 is disposed on the radially outside of the breaker 7 and made of cords whose cord angle is almost zero or less than about 5 degrees with respect to the tire circumferential direction.

In this example, the rubber tire components G include: a tread rubber G1 disposed in the tread portion 2 and on the radially outside of the belt to define the ground contacting surface; a sidewall rubber G2 disposed in each sidewall portion 3 and on the axially outside of the carcass 6 to define a part of the outer surface of the tire; an innerliner rubber G3 disposed inside the carcass 6 to define the almost entire inner surface of the tire; a clinch rubber G4 disposed in each bead portion 4 to define the bottom surface and axially outer surface of the bead portion; a belt cushion rubber G5 disposed between each edge of the belt (7) and the carcass 6; and a bead apex rubber G6 disposed in each bead portion 4 so as to extend radially outwardly from the bead core 5.

Using the uncured rubber tire components G, G1-G6 (hereinafter referenced by "Gn, G1n-G6n"), the tire 1 is manufactured, and at least one of the uncured rubber tire components Gn is formed by the method according to the present invention.

Here, one component Gn means an integral part made from the same rubber compound, regardless of whether it has reinforcing fiber/cords or the compound only.

According to the present invention, the relevant uncured rubber tire component Gn is formed by winding a plurality of tapes 15 directly or indirectly on a rotating drum, traversing along the direction of the rotational axis of the drum, wherein the tapes 15 are made of the same uncured rubber compound.

The width and thickness of each tape 15 and the tape winding pitch (or traversing speed) and traversing direction are determined so as to avoid an operation aiming at the formation of a steep down slope (more than about 45 degrees) in the traversing direction by abruptly changing the winding pitch (from small to large) or traversing speed (from slow to high) under such condition that the almost entire width of the tape is inclined towards the traversing direction at an angle of more than 45 degrees. As briefly explained above, on the drum or winding object, when the almost entire width is inclined at an angle of more than 45 degrees toward the traversing direction, even if the pitch is increased with intent to separate the tape to be wound, from the previous windings of the tape, the tape is gravitated to the previous windings, and the intended steep down slop is hard to form only a gentle down slope can be formed. Such phenomenon is very liable to occur when more than about 70 or 80% width of the tape is inclined at more than 45 degrees. Thus, in this invention, the steep down slop in a traversing direction is formed as an upslope in the reversed traversing direction by heaping up the windings.

Taking the uncured tread rubber G1n as example, the method for making an uncured rubber tire component according to the present invention is described hereunder.

In the exemplary tire 1 shown in FIG. 1, the above-mentioned tread grooves include two circumferential grooves (g) disposed one on each side of the tire equator C.

Figure 2:
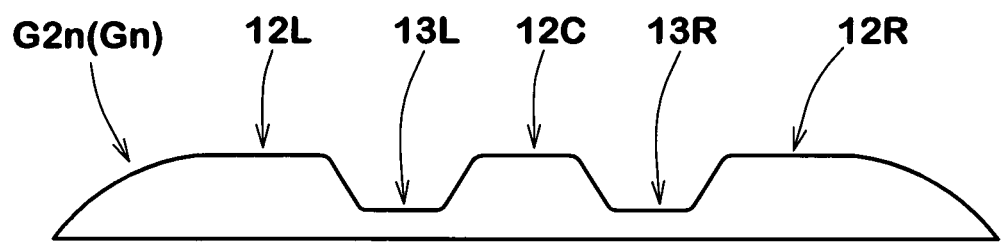
FIG. 2 is a cross sectional view of an uncured rubber tire component therefor which is an uncured tread rubber provided with two circumferential extending indentations.

As the tread rubber G1 is provided with the two circumferential grooves (g) and has an almost trapezoidal cross-sectional shape as shown in FIG. 1, the uncured tread rubber G1n also has a similar almost trapezoidal cross-sectional shape as shown in FIG. 2, and two circumferentially extending indentations or thin parts 13L and 13R are formed in tire axial positions corresponding to the axial positions of the circumferential grooves (g). Accordingly, the uncured tread rubber G1n has a right thick part 12R, a central thick part 12C and a left thick part 12L which are thicker than the two thin parts 13L and 13R.

Figure 3:
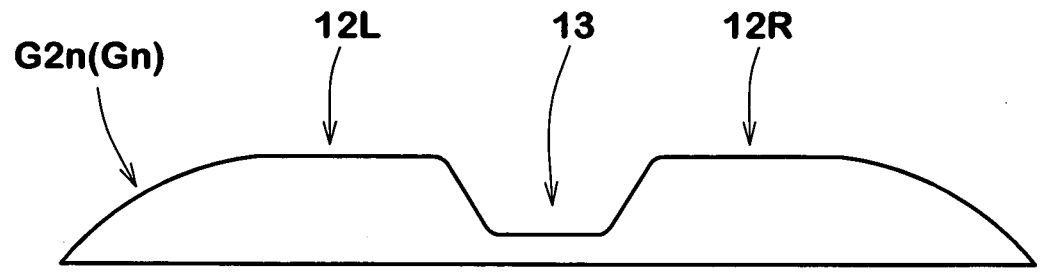
FIG. 3 is a cross sectional view of another example of the uncured rubber tire component which is provided with a single indentation extending in the circumferential direction thereof.

Of course, another arrangement is possible. If a single circumferential groove is disposed on the tire equator C, the uncured tread rubber G1n is provided with a single circumferentially extending thin part 13 as shown in FIG. 3.

Figure 4:
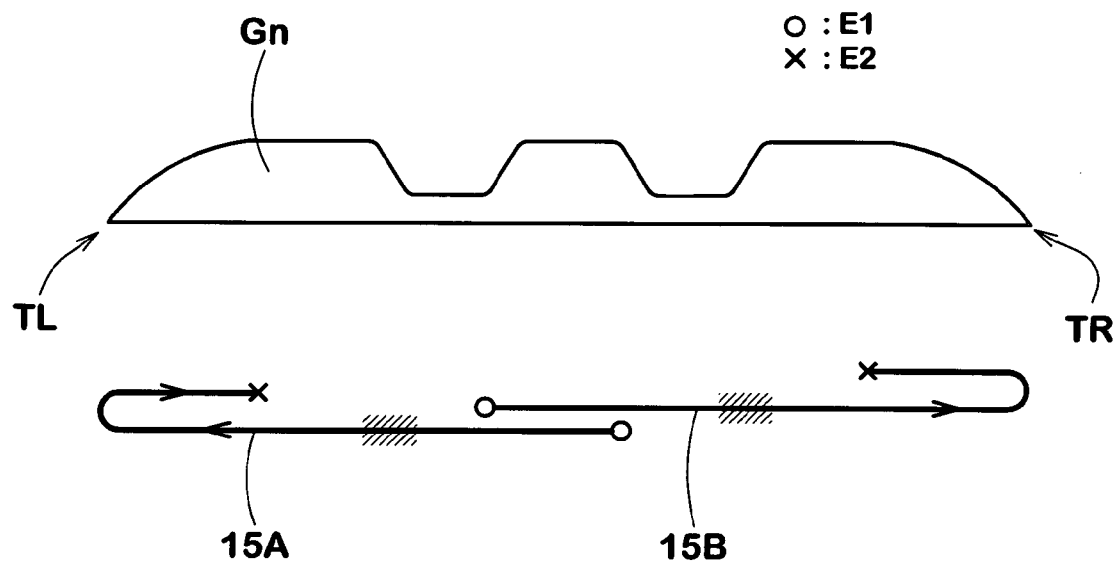
FIG. 4 is a diagram for explaining the winding operation for the uncured rubber tire component shown in FIG. 2.

In the case of the FIG. 2 example, an example of the winding operation is shown in FIG. 4, wherein a first rubber tape 15A is wound from a winding start point (tape end E1) near the left edge of the right thin part 13R to the left edge TL of the uncured tread rubber G1n, while traversing leftwards (first stroke), and then turning the traverse direction rightwards, the tape 15A is continuously wound to a winding ending point (tape end E2) near the midpoint of the left thick part 12L (second stroke).

A second rubber tape 15B is wound from a winding start point (tape end E1) near the right edge of the left thin part 13L to the right edge TR of the uncured tread rubber G1n, while traversing rightward (first stroke), and then turning the traverse direction leftwards, the tape 15B is continuously wound to a winding end point (tape end E2) near the midpoint of the right thick part 12R (second stroke).

Accordingly, in the central thick part 12C, the first stroke of the first rubber tape 15A and the first stroke of the second rubber tape 15B are overlapped. In the right thick part 12R, the first and second strokes of the second rubber tape 15B are overlapped. In the left thick part 12L, the first and second strokes of the first rubber tape 15A are overlapped.

Figure 5:
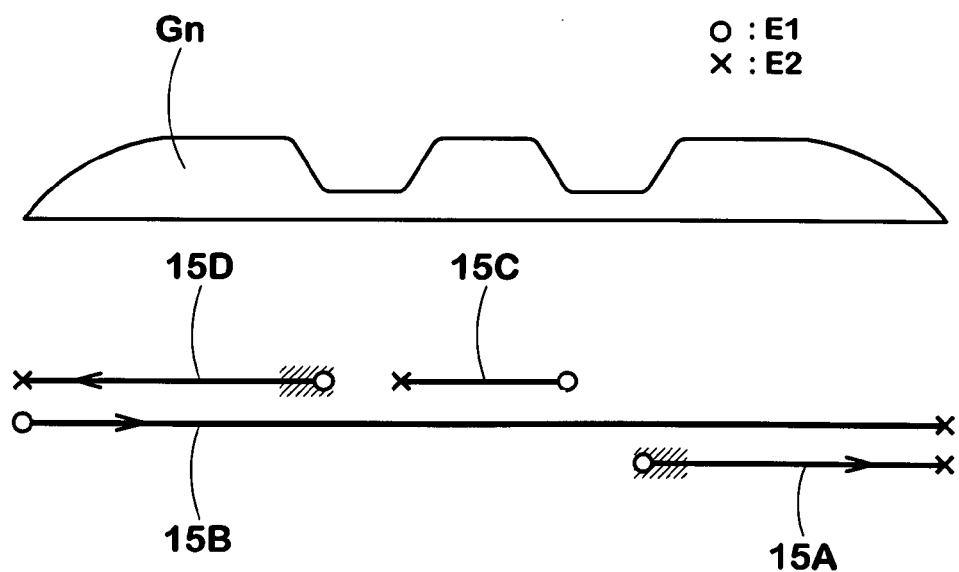
FIG. 5 is a diagram for explaining another example of the winding operation for the component shown in FIG. 2.

FIG. 5 shows another example of the winding operation for the FIG. 2 example, wherein a first tape 15A is wound from a winding start point (tape end E1) near the left edge of the right thick part 12R to a winding end point (tape end E2) at the right edge TR of the uncured tread rubber G1n, while traversing rightward (one stroke). At the same time, a second tape 15B is wound from a winding start point (tape end E1) at the left edge TL of the uncured tread rubber G1n, to a winding end point (tape end E2) at the right edge TR of the uncured tread rubber G1n, while traversing rightward (one stroke). The tape applicator let off the first tape 15A is retuned and lets off a third tape 15c which is wound from a winding start point (tape end E1) near the right edge of the central thick part 12C to a winding end point (tape end E2) near the left edge of the central thick part 12C while traversing leftward (one stroke). Further, a fourth tape 15D is wound from a winding start point (tape end E1) near the right edge of the left thick part 12L to a winding end point (tape end E2) near the left edge of the uncured tread rubber G1n, while traversing leftward (one stroke).

Accordingly, in the central thick part 12C, the stroke of the tape 15B and the stroke of the tape 15c are overlapped. In the right thick part 12R, the stroke of the tape 15A and the stroke of the tape 15sB are overlapped. In the left thick part 12L, the stroke of the tape 15sB and the stroke of the tape 15D are overlapped.

Figure 6:
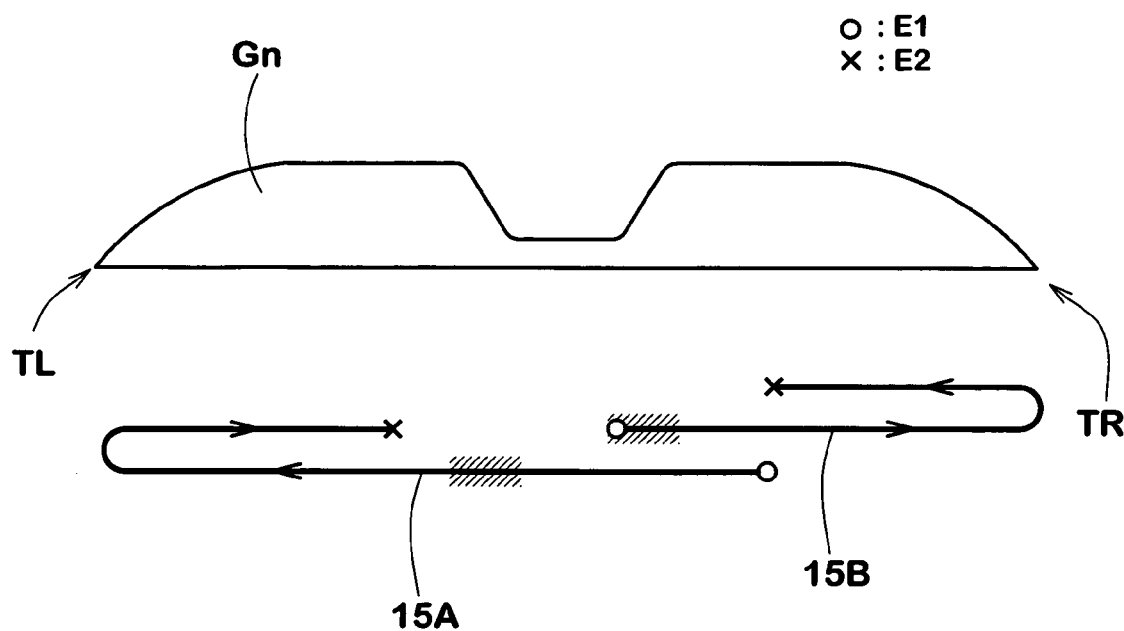
FIG. 6 is a diagram for explaining the winding operation for the uncured rubber tire component shown in FIG. 3.

In the case of the FIG. 3 example, as shown in FIG. 6, a first rubber tape 15A is wound from a winding start point (tape end E1) near the right edge of the thin part 13 to the left edge TL of the uncured tread rubber G1n, while traversing leftwards (first stroke), and then turning the traverse direction rightwards, the tape 15A is continuously wound to a winding ending point (tape end E2) near the right edge of the left thick part 12L (second stroke). A second rubber tape 15B is wound from a winding start point (tape end E1) near the right edge of the thin part 13 to the right edge TR of the uncured tread rubber G1n, while traversing rightward (first stroke), and then turning the traverse direction leftwards, the tape 15B is continuously wound to a winding end point (tape end E2) near the midpoint of the right thick part 12R (second stroke). Accordingly, in the right thick part 12R, the first and second strokes of the second rubber tape 15B are overlapped. In the left thick part 12L, the first and second strokes of the first rubber tape 15A are overlapped.

Figure 7:
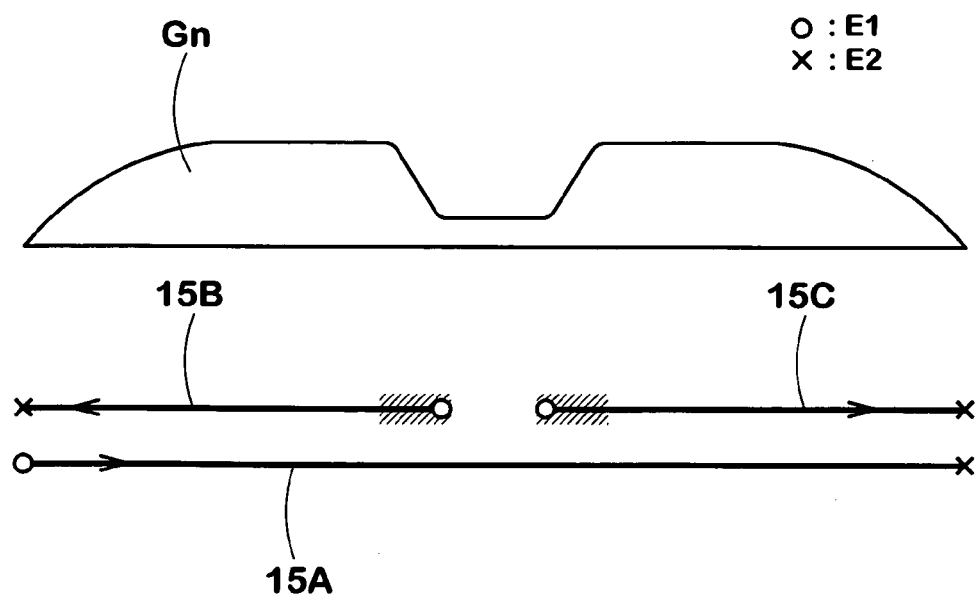
FIG. 7 is a diagram for explaining another example of the winding operation for the component shown in FIG. 3.

FIG. 7 shows further example of the winding operation for the FIG. 3 example, wherein a first tape 15A is wound from a winding start point (tape end E1) at the left edge TL of the uncured tread rubber G1n, to a winding end point (tape end E2) at the right edge TR of the uncured tread rubber G1n, while traversing rightward (one stroke). A second tape 15B is wound from a winding start point (tape end E1) near the right edge of the left thick part 12L to a winding end point (tape end E2) near the left edge TL of the uncured tread rubber G1n, while traversing left (one stroke). A third tape 15C is wound from a winding start point (tape end E1) near the left edge of the right thick part 12R to a winding end point (tape end E2) near the right edge TR of the uncured tread rubber G1n, while traversing rightward (one stroke).

In any case, therefore, it is possible to largely change the thickness of the uncured tread rubber G1n without largely changing the winding pitches, so as to adapt to the required cross sectional shape thereof.

As has been explained, the axial positions of the winding start points and winding end points, namely, the axial positions of the tape ends E1 and E2 are set in the vicinities of the thickness transitional points between the thick part and thin part, inclusive of the positions of the edges of the uncured tread rubber G1n. And the traversing direction of each tape (or tape applicator) is determined such that, in the traversing direction in each stroke, an abrupt increase in the traversing speed (namely, an abrupt increase in the winding pitch) to form a down slope is avoided, although an abrupt decrease to form an upslope is allowed. In other words, if it is necessary to form a steep slope more than 45 degrees, the windings of a tape is heaped up, while traversing the tape by small winding pitches, so that the rear edges of the heaped-up windings in the traversing direction form the steep slope or become a base of other windings which form the surface layer of the steep slope.

In FIGS. 4-7, the heaped-up parts where the winding pitches are relatively small within the respective stroke are indicated by hatching.

In the thick parts, the strokes are overlapped. Therefore, the inclination of the tapes in each stroke can be decreased. As the tapes can share the thickness, if the tape is necessary to be wound down along a steeply inclined surface, a part of the tape inclined at more than 45 degrees can be decreased less than 70% of the tape width. Therefore, the above-mentioned phenomenon of the tape gravitated towards the steeply inclined surface can be prevented. Further, the change in the traversing speed in each stroke can be reduced, the controlling of the traverse motion becomes easier.

As explained above, a plurality tapes are used to make one component, therefore, the number of the ends E1 and E2 of the tapes becomes large. Further, when a plurality of rubber components Gn are formed in this way, a large number of the ends E1 and E2 exist in the tire, therefore, it is important to arrange the ends E1 and E2 in order.

Figure 8:
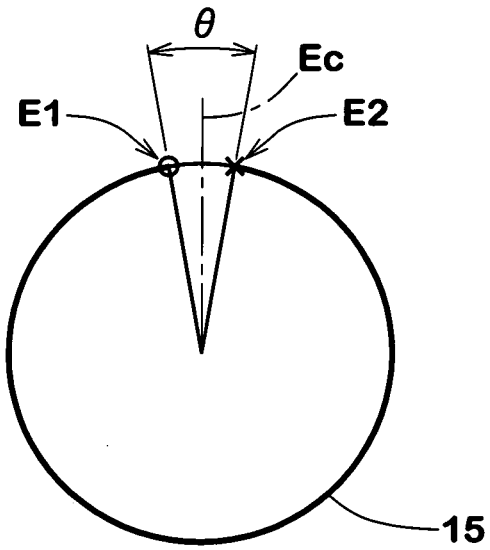
FIG. 8 is a diagram for explaining the circumferential positions of the two ends of each rubber tape.

FIG. 8 schematically shows the tape ends E1 and E2 of one of the wound tapes 15 when viewed from the side.

In order to even the mass distribution, the angle (theta) between the two tape ends E1 and E2 around the tire rotational axis is set in a range of not more than 90 degrees, preferably less than 70 degrees, more preferably less than 50 degrees, still more preferably less than 20 degrees. Here, the angle (theta) correspond to the shortage from an integral multiple of 360 degrees.

Figure 9:
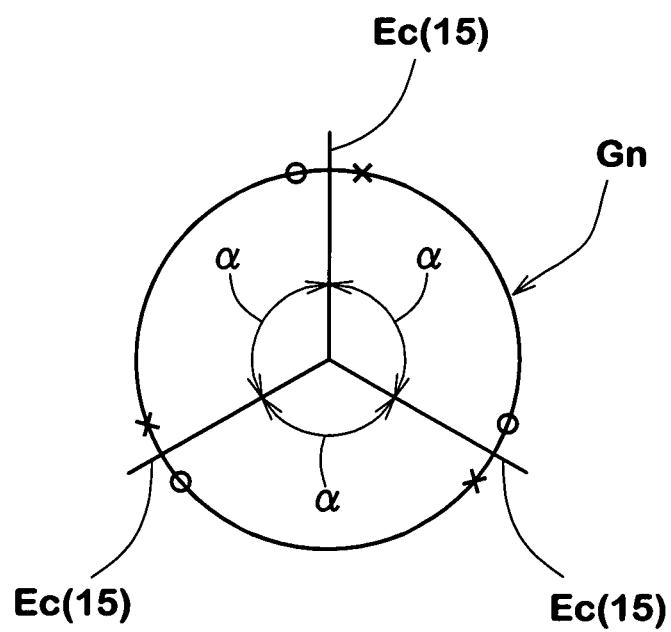
FIG. 9 is a diagram for explaining the circumferential positions of the ends of all of the rubber tapes.

Further, as to the midpoint EC between the tape ends E1 and E2 of each tape, it is preferable that the midpoints Ec of all the tapes are evenly distributed around the tire rotational axis as shown in FIG. 9. More specifically, the angle (alpha) between the midpoints Ec is (360/n) degrees +/−10%, wherein "n" is the number of the rubber tapes 15 in one component.

Furthermore, as to the angle (theta) of each tape, it is preferable that all the tapes are substantially the same value when all the tapes have the substantially same cross sectional areas.

In general, it is preferable that the angle (theta) is almost 0 degree. But, it is possible to intentionally set all the angles (theta) to a small value in order to utilize the local mass shortage to intentionally increase a specific high-order harmonic component of a high-speed force variation such as Radial force variation RFV and Tractive force variation TFV to thereby decrease a low-order harmonic component such as the 2nd-order harmonic component or 1st-order component.

These arrangements of the ends E1 and E2 are usually applied to one component Gn. But, in the case that a plurality of components Gn are each made by winding a plurality tapes, these arrangements can be applied to the plural components in a comprehensive manner.

Such method for making the uncured rubber tire component is incorporated in a method for manufacturing the pneumatic tire 1, for example as follows. The raw belts 7 and 9 are wound on a profiled surface of a belt drum. Then, the uncured tread rubber G2n is formed on the belts by winding the tapes 15 as explained above. Therefore, a tread assembly of the tread rubber and belts is made on the other hand, using a tire building drum, a tire main body is formed by assembling the remaining uncured rubber components, carcass, bead cores and the like. The tire main body and the tread assembly are combined to form the uncured tire. The uncured tire is vulcanized in a mold. Thus, the pneumatic tire is manufactured.

In making the uncured rubber tire component, it is desirable to use a plurality of tape applicators to wind a plurality of the tapes 15 simultaneously because the tape winding time can be shortened and the production efficiency can be improved. But it is also possible that the number of tape applicator(s) is less than the number of the wound tapes.

As described above, in the method for making an uncured rubber tire component and the method for manufacturing a tire according to the present invention, a plurality of tapes are wound, staring from axially different positions towards suitable directions determined based on the arrangement of the relatively thick part, thin part and steep slope to be formed. Therefore, in comparison with a single tape, the variation of the winding pitch can be decreased, especially, an abrupt increase in the winding pitch can be avoided. Accordingly, the occurrence of the annoying gravitating phenomenon is prevented and the difference between the intended shape and the actual cross-sectional shape of the formed uncured rubber tire component is decreased, and as a result, it becomes easier to make tire components having various cross sectional shapes.

In the pneumatic tire according to the present invention, the residual stress in the cured rubber component occurring during vulcanizing-molding due to the difference between the intended shape and the actual shape is decreased, therefore, the tire uniformity such as RFV, TFV can be improved.

The invention claimed is:
1. A method for making an uncured rubber tire component, the uncured rubber tire component being an annular body having a circumferentially extending indentation on the outer surface thereof defining a steep slope, whereby the uncured rubber tire component has a thin portion and a thick portion each, having a width smaller than the width of the uncured rubber tire component, the method comprising:

winding each of a plurality of tapes continuously, a plurality of times around an axis to form a plurality of continuous, axially adjacent, circumferential windings, while traversing each of the tapes along the axis at a controlled traversing speed so that the uncured rubber tire component is collectively formed by the continuous, circumferential windings of each of the tapes, wherein said tapes, each have a constant width smaller than the width of the uncured rubber tire component and are made of an uncured rubber compound, the number of strokes of the traversing of said plurality of tapes is increased in the thick portion over that of the thin portion of the tire component, wherein the winding operation of at least one of the tapes is made while traversing the thin portion at least once, wherein the winding of said plurality of tapes includes winding at least one of the tapes so as to heap up the windings of the or each tape to form said steep slope, the method further comprising controlling the traversing speeds of the respective tapes so that said steep slope is formed as an upslope in a traversing direction of the or each tape being wound to form said steep slope, and a steep down slope of more than 45 degrees is not formed in said traversing directions.

2. The method according to claim 1, wherein
said plurality of tapes forming the uncured rubber tire component are made from the same rubber compound.

3. The method of claim 1, wherein the angular midpoint between tape ends of all the tapes are evenly distributed around the tire rotational axis.

4. The method of claim 3, wherein an angle between the midpoints is (360/n) degrees ±10%, wherein n is the number of the rubber tapes in one component.

5. The method of claim 1, wherein the traversing of the tapes defines an overlaying relationship.

6. The method according to claim 1, wherein the thin portion is formed by a tape that has a starting end that is within the boundaries that define at least one circumferential groove.

7. The method according to claim 1, wherein the thin portion is formed by a tape that has a starting end that is within the boundaries that define a pair of circumferential grooves.

8. A method for manufacturing a rubber tire comprising the steps of:

making an uncured rubber tire by assembling uncured rubber tire components; and vulcanizing the uncured rubber tire, wherein at least one of said uncured rubber tire components is made by the method according to claim 1.

9. The method according to claim 8, wherein
said uncured rubber tire component is a tread rubber provided with two circumferential extending indentations.

* * * * *